June 2, 1953
W. S. PAJES
2,640,936
METHOD AND APPARATUS FOR INDICATING
THE MOVEMENT OF MATERIAL
Filed Feb. 7, 1950
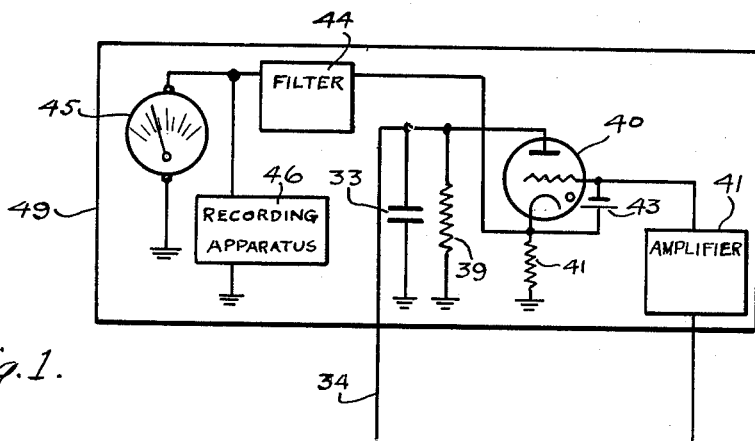
Fig. 1.
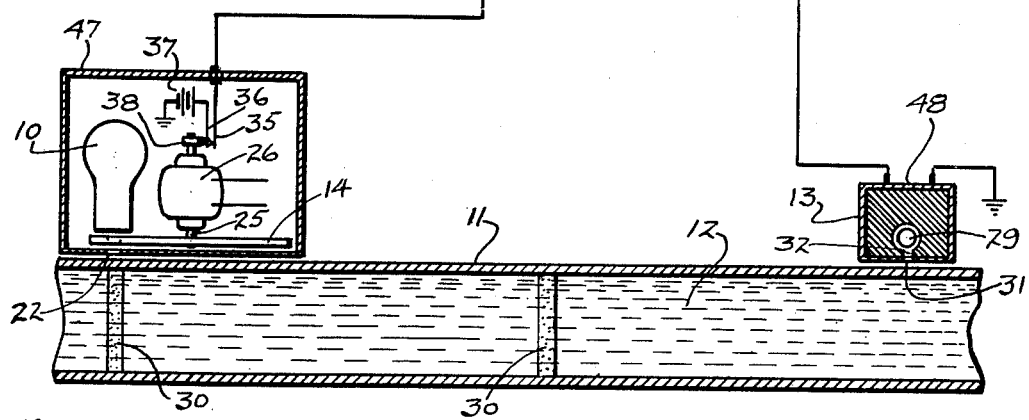
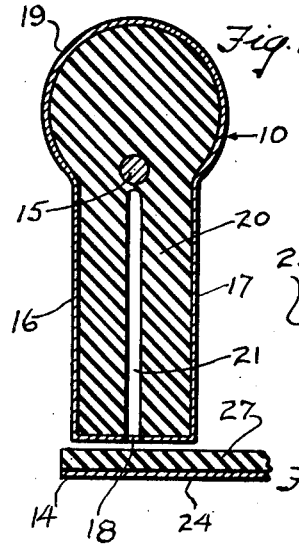
Fig. 2.
Fig. 3.
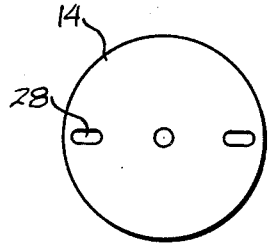
Fig. 4.
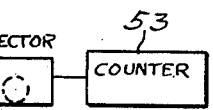
Fig. 5.
INVENTOR
WOLF SZMUL PAJES
BY
Robert Harding Jr.
ATTORNEY Patented June 2, 1953

2,640,936

UNITED STATES PATENT OFFICE 2,640,936

METHOD AND APPARATUS FOR INDICATING THE MOVEMENT OF MATERIAL

Wolf Szmul Pajes, New York, N. Y.

Application February 7, 1950, Serial No. 142,855

16 Claims. (Cl. 250—43.5)

This invention relates to a method and apparatus for determining certain desired facts concerning the movement of material, either solid, liquid, or gas, between two predetermined points in the path of travel of such material. For instance, it may be desired to determine the rate of movement of certain materials flowing in a steady stream between the two points in order to ascertain the quantity passing therebetween, or it may be desired to count the number of objects passing between the two points. The invention is applicable to many fields and may be used whether the material under study is in plain view and accessible to contact with apparatus placed near the path thereof, or invisible or inaccessible to such contact, as, for instance, would be the case of a fluid flowing through a pipe. The invention may be particularly applicable to the last-mentioned conditions and may be incorporated with excellent results in a flow meter.

It is one of the objects of the invention to provide a method and an apparatus such that by affecting or treating material passing a given point in a certain manner it becomes possible to detect the presence of the same material as it passes another distant point lying in the direction of movement from the first point.

Another object of the invention is to accomplish the object of the above paragraph regardless of whether or not the material is enclosed in a pipe or other envelope while passing between the two points.

Another object of the invention is to provide a method and apparatus as defined above in which the two steps referred to may be indicated and, if desired, recorded at a remote point which may be any distance from the material being studied or metered.

Still another object of the invention is to provide a flow meter which does not have to be built (in series) in to the pipe system but is operated on the outside of the pipe without changing the pipe in any way and therefore is completely portable.

Another object of the invention is to provide a flow meter which may be simply and inexpensively constructed and may be quickly and easily applied to any pipe to obtain the rate of flow of the fluid therein.

Still another object of the invention is to provide a flow meter which lends itself particularly to telemetering, since the indication is obtained by electrical impulses which may be transmitted to any reasonable distance and easily recorded.

Other objects of the invention and objects relating to the method of constructing and assembling the various parts thereof will be apparent from the following description taken in conjunction with the accompanying drawings, in which:

Figure 1 is a schematic diagram of one embodiment of the invention adapted for use as a flow meter and shown applied to a pipe in which a fluid is flowing;

Figure 2 is a sectional elevation of one form of particle emitting gun shown in Figure 1;

Figure 3 is a sectional elevation of an accessory part of the gun;

Figure 4 is a plan view of the shutter used with the arrangement of Figure 1; and Figure 5 is a plan view of a modified form of the invention used as a counter.

Referring more specifically to the drawings, the invention has been shown in Figure 1 incorporated in a flow meter which comprises a gun or particle emitter 10 mounted adjacent a pipe 11 through which is flowing a fluid 12 whose rate of flow is to be measured. A detecting device 13, responsive to a certain form of radiation is also mounted adjacent the pipe at a short distance in the direction of flow from the gun 10. A shutter 14 in the form of a rotatable disc is mounted between the gun 10 and the pipe 11. The purpose of the shutter 14 is to block the path of the particles except at intervals, so that the pipe is subject to intervals of bombardment spaced in time a predetermined amount depending on the speed of the shutter.

In carrying out the invention it is necessary for the particles or radiation which bombard the pipe to pass through the wall thereof and enter into the fluid therein. This can be accomplished by using a source of gamma ($\gamma$) rays or neutrons, which sources are now well known. For the purpose of the invention I may prefer to use a neutron gun, and a convenient neutron for my purpose may be that known as a "neutron howitzer" which may be constructed as illustrated in Figure 2. A small radioactive pellet 15 is provided for continuously emitting neutrons, and this pellet may be made by mixing a small amount of radon (Rd) with beryllium (Be) filings in a known manner. This pellet is mounted centrally within a container 16 having a cylindrical portion 17 closed at one end except for a window 18 and a bulbous other end 19 larger in diameter. It is desired to have a collimated beam of neutrons from the pellet 15 and direct the beam through the window 18 and at the same time prevent their emanating from any other part of the container 16.

It is possible to absorb or obstruct neutrons with the metal cadmium by first reducing the velocity of the neutrons, and the velocity may be reduced by having the neutrons pass through a hydrocarbon such as paraffin. Therefore, I make the container 16 of cadmium and fill it with paraffin 20 except for a straight duct 21 extending from the pellet 15 through the paraffin in the cylindrical portion 17 to the window 18. The neutrons emitted in every direction except in that of the window 18 by the pellet 15 move through the paraffin towards the container walls and are slowed down by the paraffin and stopped by the cadmium wall of the container. The neutrons passing through the duct 21 are unobstructed and pass out of the window 18 in a stream illustrated at 22 in the figures.

Since the length of the path the neutrons travel through the paraffin will determine their velocity, it is possible to adjust the velocity of neutrons passing out of the window 18 by inserting a paraffin plug or rod 23 in the duct 21 of the proper length. This is desirable because different conditions of use, e. g. different fluids, may require different neutron velocities for most effective use of the device.

The shutter 14 to cooperate with the neutron gun just described may preferably be formed of a paraffin-clad disc 24 of cadmium mounted on a shaft 25 driven by a motor 26 the speed of which is closely controlled in any desired manner. Since the cadmium disc will stop only slow moving neutrons, I provide the layer 27 of paraffin on the disc 24 between the cadmium disc and the window 18 to slow down the neutrons striking the shutter.

The shutter 14 is provided with one or more holes or radial slots 28 positioned so as to cross the path of the neutrons, so that the neutrons will pass through the shutter in intermittent spurts as the shutter rotates.

The detecting device 13 which is mounted a short distance from the gun 10 is preferably responsive to gamma rays and may be an ordinary Geiger counter 29 comprising an envelope within which are mounted an anode and a cathode surrounded by an ionizable gas.

Because the gun 10 is positioned so that the duct 21 is substantially normal to the pipe 11, each time the slot 28 passes in front of the window 18 a spurt of neutrons enters a short cylindrical section of the fluid within the pipe which is indicated at 30. The radiation after penetrating the pipe shell will cause, or enter into, nuclear reactions with the nuclei of the molecules of which the fluid is constituted. These reactions may be as follows:

I. If the source is a neutron source, a neutron will enter a given nucleus of the fluid and produce a gamma ray, a proton, and alpha particle, two neutrons, or fission. This may be represented in the following manner: $(n,\gamma)$, $(n,p)$, $(n,a)$, $(n2n)$, $(n,f)$, etc.

II. If the source emits gamma rays, a gamma ray will enter a given nucleus of the fluid and produce a neutron, a proton, an alpha particle, or fission. This may be represented in the following manner: $(\gamma,n)$, $(\gamma,p)$, $(\gamma,a)$, $(\gamma,f)$, etc.

Each of the above reactions will take place. However, their probability of happening varies widely, and thus some types of reactions will happen much more often than others. The important fact for this invention is that radioactive isotopes of the fluid constituent will be formed. These isotopes will therefore emit various radiations. There will be alpha ($a$) radiations, beta ($\beta$) radiations, but also there will unavoidably be gamma ($\gamma$) rays. Each of these radiations will have a certain half-life the duration of which will vary for each radiation. The half-life, however, will have a long enough duration so that $\gamma$-radiation from the section 30 of the fluid will be intense enough when it passes the detecting device 13 to produce a response in that device.

Assuming that the flow in the pipe is laminar, with negligible turbulence, the radioactive fluid cylindrical section 30 will travel with the flow down the pipe with the speed of the flow. This moving radioactive cylinder will be emitting radiation all the time, including $\gamma$-rays in all directions. In order to insure that the $\gamma$-rays will be registered, only when the radioactive cylinders pass the detecting device, the housing for the Geiger counter is made of lead with a window 31 in the side towards the pipe and a straight duct 32, normal to the wall of the pipe, leading from the window to the Geiger counter. Thus, gamma rays emanating from the cylindrical section 30 of the fluid before it reaches the detecting device 13 will arrive at an angle and will be obstructed by the lead housing, and not until the section reaches the detecting device will gamma rays pass into the housing and cause ionization of the gas in the Geiger counter.

If the time interval between the moment of bombarding the fluid and the moment of detection is measured and the distance between the two points is exactly known, then by a simple calculation the velocity of flow can be determined:

$$v = \frac{S}{t_2 - t_1}$$

where $v$ equals the velocity of flow, S the distance between the two points, $t_2$ equals the time of detection, and $t_1$ the time of bombardment. The shorter the time interval elapsed for a given spacial separation, the higher is the velocity of flow of the fluid. It is a simple matter to include in the calibration the internal diameter of the pipe and so obtain a direct reading of the rate of flow.

Any suitable device may be used for measuring the time displacement between the time when the shutter 14 releases a spurt of neutrons into the pipe and the time when radiation from the pipe affects the detecting device.

In one convenient arrangement a condenser is charged by an extraneous source each time neutrons enter the pipe from the gun 10 and permitted to discharge slowly through a resistance. It is then discharged completely each time the detection device functions. The charge left on the condenser just prior to the complete discharge will then be a measure of the time displacement and therefore the rate of flow.

Such an arrangement is shown in Figure 1. A condenser 33 has one side connected by a wire 34 to a contact 35 mounted adjacent the shaft 25 of the motor 26. Another contact 36 mounted in spaced cooperative relationship with the contact 35 is connected to the positive pole of a source of potential, such as the battery 37, the other pole of the source being grounded. A cam 38 on the shaft 25 is arranged to close the contacts 35 and 36 whenever a slot 28 lines up with the window 18. The other side of the condenser 33 is connected to ground and a resistance 39 is shunted across the condenser. Thus connected, the condenser is charged every time a slot 28 passes the window 18 and permits neutrons to pass into the pipe 11, and then discharges slowly through the resistance.

In order to complete the discharge of the condenser suddenly under control of the detector 13, I provide an electron discharge tube 40 which may preferably be a thyratron with its anode connected to the wire 34 and its cathode connected through a resistance 41 to ground. The control electrode of the tube is connected to the Geiger counter 29, a suitable amplifier 42 being interposed to deliver a strong positive pulse to the control electrode every time the Geiger counter operates. The control electrode is normally biased by connecting it to the negative pole of a battery 43, the positive pole of which is connected to the cathode of the tube. Every time the Geiger counter is energized a positive potential is delivered to the control electrode of the tube making it conductive and thus providing a discharging path for the condenser 33 through the anode-cathode circuit of the tube.

In order to measure the average amount of charge left on the condenser 33 at successive times of discharge I connect a suitable circuit 44 across the resistance 41 and connect its output through a voltmeter 45 to ground. The circuit 44 integrates the discrete voltages appearing across the resistance 41 and produces a steady voltage the value of which will be inversely proportional to the rate of flow of the fluid. When the internal diameter of the pipe is known, the quantity of fluid passing through the pipe per unit of time may be easily calculated, and if desired the meter 45 may be calibrated to read, for instance, "gallons per minute." If desired the output of the circuit 44 may be connected to any suitable recording apparatus 46 for continuously recording the flow.

The entire apparatus may be housed in three boxes, 47, 48, and 49, connected by cables, the box 47 containing the gun 10 and shutter 14, the box 48 containing the detector 13, and the box 49 containing indicating apparatus consisting of the meter 45, condenser 33, and associated devices and circuits therefor. It will be evident that the box 49 does not need to be positioned in the vicinity of the boxes 47 and 48, and may be at any remote point, even miles away from the pipe under consideration.

In Figure 5 an arrangement for counting objects 50 passing on a conveyor belt 51 is disclosed. The gun 10 is mounted at one side of the belt 51 and arranged to direct a stream of neutrons indicated at 52 above the belt at right angles to its direction of movement. As each object 50 passes the gun it intercepts and receives neutrons and becomes sufficiently radioactive to affect the detector 13 positioned a slight distance along the belt in the direction of movement. The output of the detector is connected to any suitable counting device arranged to be responsive thereto and the counting device will thereupon count the objects which pass in front of it. Of course the counting device may also be positioned at a remote point if desired.

From the above it will be seen that I have provided a simple apparatus which will have many uses in connection with obtaining information about the movement of materials. Applied to a flow meter the apparatus will perform on the outside of pipe lines unlike the Venturi or rotary flow meter. The advantages of a flow meter in accordance with the invention are manifold. Among others it is mobile and can be moved to different branches of the pipe line circuit without having to close or break the circuit. Another advantage is that it is not subject to corrosion in case corrosive liquids are to be metered. Still another advantage is that it can be made much cheaper than other flow meters using hydraulic principles. And perhaps the most important advantage is that it is especially adaptable for telemetering, as described above.

It will be evident that many modifications of the arrangement shown and described may be used without departing from the spirit of the invention, and I do not therefore desire to limit my invention except by the limitations defined in the appended claims.

What I desire to claim and secure by Letters Patent is:

1. Apparatus for obtaining information about material moving in a predetermined path which comprises means spaced from said path and out of contact with said material for creating radioactive isotopes in a confined region of said material as it passes a first point in said path, means for detecting radiation from said isotopes as said isotopes pass a second point in said path, spaced in the direction of movement of said material from said first point, means controlled by said detecting means for registering each operation of said detecting means, means including said registering means for measuring the time displacement between the creation of the isotopes and the detection of the radiation, and means for utilizing the result obtained by said measuring means for determining the rate of movement of the material.

2. A flow meter comprising means for creating radioactive isotopes in a longitudinal restricted region of the fluid flowing within a pipe, said means being outside of the pipe, means adjacent said pipe at a point spaced in the direction of flow of the fluid therewithin a predetermined distance from the first-mentioned means for detecting radiation emanating from said isotopes, means for measuring the elapsed time between the creation of the isotopes and the detection of the radiation, and means for utilizing the measured time for determining the rate of flow of the fluid through the pipe.

3. A flow meter, according to claim 2, in which the means for creating radioactive isotopes comprises means for bombarding the outside of the pipe with radioactive particles substantially normally to the wall of the pipe and at such velocity that they will pass through the wall of the pipe, and in which the detecting means is arranged to detect only radiation which emanates from the pipe substantially normally.

4. A flow meter comprising means for producing a stream of high energy radioactive particles capable of passing through the wall of a pipe, means for directing said stream substantially normally against the outer surface of a pipe through which is passing a fluid whose rate of flow is to be measured, means for intermittently intercepting said stream for periods of time which are relatively long with respect to those during which the particles are passing into the pipe, means positioned outside of said pipe a predetermined distance along the pipe in the direction of flow of the fluid for detecting radiation emanating from said pipe substantially normally to the wall of the pipe, means for measuring the time displacement between a period of time when particles pass into said pipe and the next succeeding operation of said detecting means, and means controlled by said last-mentioned means for indicating the rate of flow of said fluid.

5. A flow meter, according to claim 4, in which the means for measuring the time displacement comprises a condenser, means for charging said condenser a predetermined amount every time particles enter the pipe, means for discharging said condenser every time the detecting means responds to radiation, and means for producing an electrical value representative of the time between the charging and discharging of said condenser.

6. A flow meter, according to claim 5, further comprising means controlled by the measuring means for continuously recording the time displacement.

7. A flow meter, according to claim 2, further comprising means controlled by the measuring means for recording the time displacement.

8. A flow meter comprising means for creating radioactive isotopes in a longitudinal restricted region of the fluid flowing within a pipe, said means comprising a container having walls made of a material substantiallly impervious to slow moving neutrons, a window in one wall of said container, a radioactive pellet comprising a mixture of radon and beryllium filings within said container and spaced from the walls thereof, a filling of material within said container having the property of slowing down the passage of neutrons, a substantially straight duct leading from said pellet through said last-mentioned material to said window, and means for positioning said container so that said window is adjacent the pipe and said duct is substantially normal to the wall of said pipe, means adjacent said pipe at a point spaced in the direction of flow of the fluid therewithin a predetermined distance from the first-mentioned means for detecting radiation emanating from said isotopes, means for measuring the elapsed time between the creation of the isotopes and the detection of the radiation, means controlled by the measuring means for recording the time displacement, and means for utilizing the measured time for determining the rate of flow of the fluid through the pipe.

9. A flow meter, according to claim 8, in which the container is made of cadmium and the material therein is paraffin.

10. A flow meter, according to claim 4, in which the means for producing a stream of high energy particles comprises a container having walls made of a material substantially impervious to slow velocity neutrons, a window in one wall of said container, a filling of material within said container having the property of slowing down the velocity of neutrons, a radioactive pellet comprising a mixture of radon and beryllium filings within said container and spaced from the walls thereof, a substantially straight duct leading from said pellet through said filling material to said window, means for positioning said container so that said window is adjacent the pipe and said duct is substantially normal to the wall of the pipe, and in which the means for intermittently intercepting the stream of particles comprises a shutter movably mounted in front of said window, and means for moving said shutter.

11. A flow meter, according to claim 10, in which the container is made of cadmium and the filling material is paraffin, and in which the shutter is made of paraffin with a layer of cadmium on the side thereof away from the container.

12. A flow meter, according to claim 11, further comprising means controlled by the measuring means for recording the rate of flow as indicated by the time displacement.

13. A flow meter comprising means for creating radioactive isotopes in a longitudinal restricted region of the fluid flowing within a pipe by bombarding the outside of the pipe with radioactive particles, said means comprising a container having walls made of a material substantially impervious to slow-velocity neutrons, a filling of material within said container having the property of slowing down the velocity of neutrons as they pass through it, a radioactive pellet comprising a mixture of beryllium filings and radon within said container surrounded by said material and spaced from the walls of said container, a window in said container, and a substantially straight duct through said filling material from said pellet to said window, means adjacent said pipe at a point spaced in the directiono of flow of the fluid therewithin a predetermined distance from the first-mentioned means for detecting radiation emanating from said isotopes, means for measuring the elapsed time between the creation of the isotopes and the detection of the radiation, and means for utilizing the measured time for determining the rate of flow of the fluid through the pipe.

14. A flow meter, according to claim 13, in which the container is made of cadmium and the filling material is paraffin.

15. The method of obtaining information about material moving in a pipe which comprises creating radioactive isotopes in a confined region of said material as it passes a first point along said pipe by bombarding said material through the wall of said pipe with radioactive particles from outside of said pipe and detecting radiation from said isotopes as they pass a second point along said pipe spaced in the direction of movement from said first point.

16. The method, according to claim 15, in which only radiation substantially normal to the path of movement of the material is detected at the second point.

WOLF SZMUL PAJES.

References Cited in the file of this patent

UNITED STATES PATENTS

| Number | Name | Date |
| --- | --- | --- |
| 1,611,502 | Allen | Dec. 21, 1920 |
| 1,808,709 | Blake | June 2, 1931 |
| 2,275,748 | Fearon | Mar. 10, 1942 |
| 2,377,757 | Clark | June 5, 1945 |
| 2,453,456 | Piety | Nov. 9, 1948 |
| 2,476,810 | Brunner | July 19, 1949 |
| 2,554,715 | Mellett | May 29, 1951 |

FOREIGN PATENTS

| Number | Country | Date |
| --- | --- | --- |
| 615,769 | Great Britain | Jan. 11, 1949 |

OTHER REFERENCES

"The Production of a Beam of Fast Neutrons," Aebersold Physical Rev., Oct. 15, 1939, vol. 56, pp. 714–717, 727.